United States Patent

Krause

[15] 3,696,702
[45] Oct. 10, 1972

[54] BLIND RIVET FOR TIEING HEAT INSULATION LINER IN AIR CONDUIT

[72] Inventor: John L. Krause, 15831 La Vida Drive, Palm Springs, Calif. 92262

[22] Filed: Sept. 19, 1969

[21] Appl. No.: 859,271

[52] U.S. Cl....................................................85/77
[51] Int. Cl..............................................F16b 19/10
[58] Field of Search............85/77, 78, 72, 70, 71, 36, 85/68

[56] References Cited

UNITED STATES PATENTS

| | | | |
|---|---|---|---|
| 3,267,205 | 8/1966 | Dozier | 85/78 |
| 2,862,413 | 12/1958 | Knohl | 85/36 |
| 3,205,758 | 9/1965 | Fischer | 85/36 |
| 3,426,375 | 2/1969 | Jeal | 85/70 |

FOREIGN PATENTS OR APPLICATIONS 25,535   3/1899   Great Britain................85/77

Primary Examiner—Edward C. Allen
Attorney—Dana E. Keech

[57] ABSTRACT

The device comprises a blind rivet and consists in a straight continuous piece of steel wire of uniform diameter upset near the middle thereof to provide an annular radial shoulder which divides the wire into integrally united primary and secondary stems. Slideably received on the primary stem with one end abutting against said shoulder is a tubular rivet sleeve, the opposite end of which has formed thereon an annular external flange. The invention is provided for tieing a relatively thick heat insulation liner against the inner face of the wall of an air conduit which is provided with holes at suitable intervals of a proper diameter to slideably receive said rivet sleeve. The preferred method of employing the invention is to apply a coat of cement to the inner face of said wall and then roll said liner against the tacky inner surface of said wall to line said conduit therewith. The primary stem is then inserted in a blind rivet setting tool and the secondary stem is inserted through one of the holes in said conduit wall and stabbed through the layer of insulation adhering thereto, after which the tool is operated to set said blind rivet in said hole and unite the same with said conduit wall, with said secondary stem protruding inwardly from the inner surface of say layer of insulation. A pinch washer is now pressed onto the protruding inner end of the secondary stem to confine the insulation liner and keep it from falling away from said wall. The unused portion of the primary stem outside the conduit may be removed by wire cutters or this stem may be weakened at a point near said sleeve so that the normal force applied in setting the rivet fractures the primary stem at this point of weakness leaving the rivet permanently united with the conduit wall.

4 Claims, 5 Drawing Figures

PATENTED OCT 10 1972          3,696,702

INVENTOR.
JOHN L. KRAUSE
BY
ATTORNEY.

3,696,702

BLIND RIVET FOR TIEING HEAT INSULATION LINER IN AIR CONDUIT

SUMMARY OF INVENTION

Heretofore, the fastening of heat insulating liners to the inner surfaces of air conduits has been a problem, whatever the means employed. It is an object of the present invention to provide a novel means to satisfactorily solve this problem.

One expedient tried out was to fix nails on the inner surface of the conduit and, after this has been done, apply liner material to that surface, impaling the same on said nails, and then press spring pinching washers onto the protruding points of the nails to retain the liner in place.

Still another prior expedient which consists in boring holes in the metal wall of an air conduit, installing blind rivets in said holes from a given face thereof, leaving the entire rivet stems protruding from said face, applying layers of heat insulating material so as to impale the same on said stems, and applying pinch washers to said stems to hold said layers in place.

In both of these prior methods, the impaling of the packing material on the nails or blind rivet stems after these are installed is difficult to do. This difficulty is increased if adhesive is spread on the surface from which the nails or stems protrude before applying the layers of insulating material.

It is therefore another object of the invention to provide a method and apparatus the results of which are not only superior to the nail and washer method or the blind rivet stem method for tieing the liner to the conduit at spaced points, but which will permit adhesive to be applied to the conduit and the liner applied to the adhesive throughout the conduit before the metal tie means for tieing down the liner at spaced points is applied.

Another object of the invention is to provide a method and apparatus for installing metal liner tie down means through holes in the conduit wall so as to be effective on the opposite side of the wall from that through which said means is applied and which will seal the holes through which the tie means has been inserted.

DETAIL DESCRIPTION OF THE INVENTION

Figure 1:
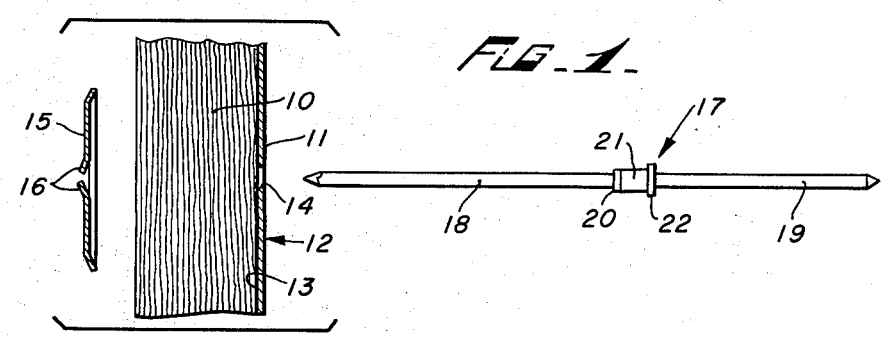
FIG. 1 is a diagrammatic sectional view of a preferred embodiment of the metal tie down means of the invention as it is about to be installed through a conduit wall to the opposite surface of which liner material has already been cemented.

The present invention has to do primarily with an apparatus for tieing down a bulky layer 10 of heat insulation material to the thin metal wall 11 of an air conduit 12. The present invention contemplates that two separate means are preferably used in attaching the insulation material 10 to the wall 11. The first of these means is a layer 13 of tar or other adhesive material which is applied to the inner surface of the wall 11 after which the material 10 is applied against said adhesive so as to be tentatively held in place against said wall. Other means employed includes a drill (not shown) for drilling holes 14 in the wall 11 which holes are dispersed at intervals of six inches or more over the entire surface of the wall, pinch lock washers 15, each of which includes a square of light sheet metal die shaped to bevel the edge portions thereof and outstrike four pinch locking teeth 16 at the center, a novel blind rivet 17 having a secondary stem 18 formed integral with the primary stem 19 being preferably of the same diameter as said primary stem and the annular shoulder 20 of the rivet and extending co-axially in the opposite direction therefrom at least as great a distance from said shoulder as said primary stem. The end 0 of stem 18 is preferably pointed.

Figure 3:
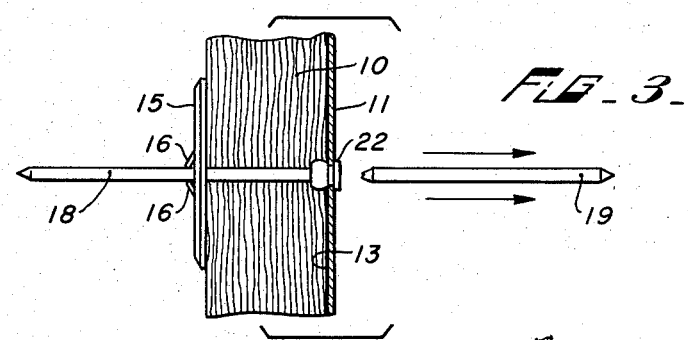
FIG. 3 is a view illustrating the next three steps in said method consisting in fixing said blind rivet in said hole, snapping off the primary operating stem, and pressing said pinch spring washer snugly against said liner.
Figure 4:
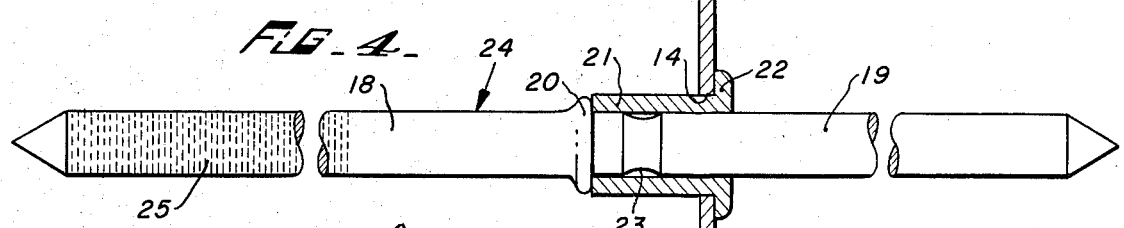
FIG. 4 is an enlarged sectional view of the blind rivet liner tie of the invention at the point in the method illustrated in FIG. 2.
Figure 5:
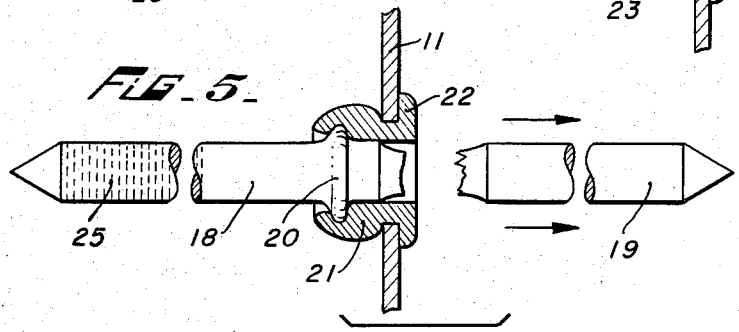
FIG. 5 is a view similar to FIG. 4 at the point in the method illustrated in FIG. 3.

The blind rivet 17 also includes the conventional rivet sleeve 21 which slips over the primary stem until one end of the sleeve engages the head 20, the opposite end of the sleeve being provided with an external annular flange 22. The primary stem 19 has an annular recess 23 formed therein for weakening said stem, this being conventional practice to cause said stem to part at this point when sufficient tension has been placed thereon to set said rivet. The apparatus used in performing the method of the invention also includes the conventional blind rivet setting tool (not shown) which accomplishes the setting of the blind rivet 17 when said tool is applied to the primary stem 19 and operated with the result as shown in FIGS. 3 and 5.

Figure 2:
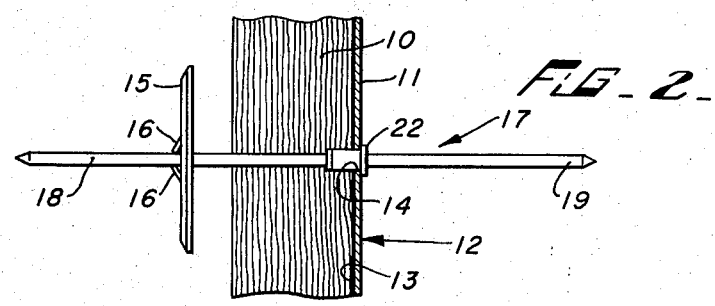
FIG. 2 is a view illustrating the next step in the method of installing said tie, in which a secondary blind rivet stem is inserted through a hole drilled in said conduit stabbed then had said liner and through a pinch spring washer impaled thereon.

The steps of the method, which follow the initial steps above described, include the insertion of secondary stem 18 of a blind rivet 17 through each of the holes 14 as shown in FIG. 2 and stabbing the pointed end of said stem through said layers of insulation 10 so that the flanged sleeve 21 thereof also extends through the hole until the annular flange 22 rests against the outer surface of the conduit wall 11. A pinch lock washer 15 may now be impaled upon the projecting end of each of the secondary stems 18 thus penetrating the insulation material 10 as shown in FIG. 2, or these washers may be applied later. In any event, as soon as the blind rivet 17 has been inserted in place in the wall 11 as shown in FIG. 2, the setting tool, above mentioned, is applied to the primary stem 19 of the rivet and actuated to set the rivet in its hole 14 and break the primary stem 19 at the weakened point 23 therein as shown in FIGS. 3 and 5. This setting of the rivets 17 seals closed the holes 14 and unites the upset rivet sleeve 21 with the annular shoulder 20 of the rivet and thus also with the secondary stem 18 so that the latter is firmly mounted on the conduit wall 11 to remain extending inwardly therefrom through the insulation material 10 as shown in FIG. 3. Whether previously applied to the secondary stem 18 or whether applied at this point, the pinch lock washers 15 are, in any event, pressed inwardly along the secondary stems 18 of the rivets until these washers, as shown in FIG. 3, pressurally engage the layer of heat insulation material 10 so as to permanently hold this insulation material pressed against the inner face of the conduit wall 11.

From the foregoing description it is believed readily apparent that the method and apparatus of the present invention provide a much simpler mode of tieing a layer of heat insulation material to the inner surface of an air conduit wall than any of the methods available in the prior art. Each of the steps of the method is relatively easy to perform and the labor cost of installing insulation material in an air conduit is thus greatly reduced by this method. In this method the application of the material to the inner surface of the conduit is done after that surface has been covered with a coating of adhesive 13 so that the insulation is tentatively held in place as applied over the whole surface to be covered before initiating the subsequent steps in the method for tieing the insulation 10 to the conduit by use of the blind rivets 17. The next step, for instance, is to drill the holes 14 and there is no difficulty in doing this as it is done from the outside of the conduit. These holes may be placed at random locations approximately equally spaced and the formation of these holes is followed immediately by the insertion of the secondary stems 18 of the blind rivets through said holes and there being stabbed through the insulation material, and the setting of each rivet follows immediately its insertion in place in one of the holes 14. This operation takes only a few seconds and starts at the inner end of the conduit so that a man crawling inside the conduit may place the pinch lock washers 15 over the inward extending ends of the rivet stems 18 and thrust these against the insulation material 10 as the insertion of the tie stems progresses along the conduit. This order enables the man inside the conduit to avoid any danger of being scratched by or impaled upon one of the rivet stems 18 protruding inwardly through the insulation material.

The secondary stem 18, the primary stem 19 and the annular shoulder 20 are preferably formed integrally as a unit 24 by conventional swedging or upsetting methods from rolls of steel wire. The secondary stem is preferably provided with a scored surface 25 to assure the retention of pinch washers 15.

At the conclusion of a job, a bolt cutter is applied to cut off the ends of the secondary stems 18 near the washers 15 leaving an upset shoulder which also helps to retain the washers on the secondary stems.

The method of this invention is not limited to using sheet metal washers 15 as washers made of plastic are equally effective. No welding being required, this invention may be used to line aluminum conduit for use on which, prior art methods, requiring welding, are inapplicable.

I claim:

1. A blind rivet for tieing a heat insulation liner in an air conduit, said rivet comprising:

a straight continuous piece of steel wire of uniform diameter substantially throughout its length and locally upset to provide an annular radial shoulder at the integral juncture of wire end sections forming a primary stem and a secondary stem of said rivet, each of said sections being of uniform diameter substantially throughout its length;

a tubular rivet sleeve slideably mounted on said primary stem with one end engaging said shoulder, said sleeve having an external flange formed from its opposite end;

said primary stem slideably fitting in a rivet setting tool to facilitate setting said sleeve in a hole in a conduit wall from outside said conduit to close said hole and to unite said rivet with said wall, said secondary stem being at least as long as said primary stem so that said secondary stem is adapted to extend through a heat insulation liner previously applied to the inside face of said wall and receive a pinch washer for tieing said liner to said wall.

2. A blind rivet as recited in claim 1 wherein said shoulder is formed on said wire near its middle and wherein the tip of said secondary stem is pointed to facilitate penetration of said liner.

3. A blind rivet as recited in claim 2 wherein said primary stem is weakened at a point near said sleeve to effect the parting of said stem at said point incidental to the setting of said sleeve in said hole.

4. A blind rivet as recited in claim 3 wherein the surface of said secondary stem is scored radially to retain a pinch washer in an adjusted position thereon.

* * * * *